(12) United States Patent
Lundström et al.

(10) Patent No.: US 10,405,154 B2
(45) Date of Patent: Sep. 3, 2019

(54) WIRELESS DEVICE MANAGEMENT BASED ON A NETWORK INITIATED POLICY AND/OR CHARGE CHANGE

(71) Applicant: Telefonaktiebolaget LM Ericsson (publ), Stockholm (SE)

(72) Inventors: Anders Lundström, Sollentuna (SE); Ulf Mattsson, Kungsbacka (SE); Aldo Bolle, Västra Frölunda (SE); Peng Li, Göteborg (SE); Lasse Olsson, Träslövsläge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/543,518

(22) PCT Filed: Feb. 24, 2015

(86) PCT No.: PCT/EP2015/053770
§ 371 (c)(1),
(2) Date: Jul. 13, 2017

(87) PCT Pub. No.: WO2016/134745
PCT Pub. Date: Sep. 1, 2016

(65) Prior Publication Data
US 2018/0332451 A1 Nov. 15, 2018

(51) Int. Cl.
*H04M 3/00* (2006.01)
*H04W 4/50* (2018.01)
(Continued)

(52) U.S. Cl.
CPC .............. *H04W 4/50* (2018.02); *H04L 67/322* (2013.01); *H04W 4/14* (2013.01);
(Continued)

(58) Field of Classification Search
CPC ....... H04W 8/245; H04W 88/02; H04W 4/50; H04W 4/14; H04L 67/322;
(Continued)

(56) References Cited

U.S. PATENT DOCUMENTS

| | | | |
|---|---|---|---|
| 7,590,596 B2 * | 9/2009 | Koskinen | G06Q 20/102 705/40 |
| 7,774,837 B2 * | 8/2010 | McAlister | H04L 63/105 726/1 |

(Continued)

FOREIGN PATENT DOCUMENTS

WO 2013049060 A1 4/2013

OTHER PUBLICATIONS

International Search Report and Written Opinion for International Patent Application No. PCT/EP2015/053770, dated Oct. 30, 2015, 10 pages.

(Continued)

*Primary Examiner* — Danh C Le
(74) *Attorney, Agent, or Firm* — Withrow & Terranova, PLLC

(57) ABSTRACT

Example embodiments presented herein are directed towards a wireless device and a Policy Control and Charging (PCC) based node, and methods therein, for managing an operating system and/or application behavior based on an indication of a network initiated policy and/or charge change. Thus, based on an indication of such a change, an applications behavior may be modified accordingly. Examples of such modification comprise initiating or restriction a communication with the network. Examples of a network initiated policy and/or charge change comprise a start or end to a non-metered connection or a change in a QoS level.

16 Claims, 9 Drawing Sheets

(51) Int. Cl.
*H04L 29/08* (2006.01)
*H04W 4/14* (2009.01)
*H04M 1/725* (2006.01)
*H04W 88/02* (2009.01)
*H04W 8/24* (2009.01)

(52) U.S. Cl.
CPC .... *H04M 1/72519* (2013.01); *H04M 1/72522* (2013.01); *H04W 8/245* (2013.01); *H04W 88/02* (2013.01)

(58) Field of Classification Search
CPC ......... H04M 1/72519; H04M 1/72522; H04M 15/00; H04M 2215/2006
USPC ................ 455/418, 550.1, 405, 406; 705/40
See application file for complete search history.

(56) References Cited

U.S. PATENT DOCUMENTS

| | | | | |
|---|---|---|---|---|
| 9,661,112 | B2* | 5/2017 | Chao | H04L 69/40 |
| 10,051,533 | B2* | 8/2018 | Fitzpatrick | H04W 48/18 |
| 2010/0103873 | A1* | 4/2010 | Buracchini | H04W 48/10 |
| | | | | 370/328 |
| 2011/0244845 | A1* | 10/2011 | Park | H04M 1/72552 |
| | | | | 455/419 |
| 2012/0077460 | A1* | 3/2012 | Kang | H04L 12/1485 |
| | | | | 455/406 |
| 2012/0167162 | A1* | 6/2012 | Raleigh | G06F 21/57 |
| | | | | 726/1 |
| 2012/0196644 | A1* | 8/2012 | Scherzer | H04W 48/18 |
| | | | | 455/524 |
| 2013/0132854 | A1* | 5/2013 | Raleigh | G06F 3/0482 |
| | | | | 715/738 |
| 2013/0322365 | A1* | 12/2013 | Garcia Martin | H04W 72/048 |
| | | | | 370/329 |
| 2014/0056182 | A1* | 2/2014 | Chai | H04L 12/14 |
| | | | | 370/259 |
| 2014/0087775 | A1* | 3/2014 | Wang | H04L 12/1407 |
| | | | | 455/466 |
| 2014/0330944 | A1 | 11/2014 | Dabbiere et al. | |
| 2015/0005004 | A1* | 1/2015 | Cuervo | H04W 64/00 |
| | | | | 455/456.1 |
| 2015/0103651 | A1* | 4/2015 | Kekki | H04W 28/0289 |
| | | | | 370/230 |
| 2015/0200847 | A1* | 7/2015 | Gourlay | H04L 49/70 |
| | | | | 370/392 |
| 2015/0201394 | A1* | 7/2015 | Qu | H04W 4/029 |
| | | | | 455/456.1 |
| 2016/0135219 | A1* | 5/2016 | Jain | H04W 40/06 |
| | | | | 370/329 |

OTHER PUBLICATIONS

Examination Report for European Patent Application No. 15707078.0, dated Mar. 1, 2019, 5 pages.

* cited by examiner

WIRELESS DEVICE MANAGEMENT BASED ON A NETWORK INITIATED POLICY AND/OR CHARGE CHANGE This application is a 35 U.S.C. § 371 national phase filing of International Application No. PCT/EP2015/053770, filed Feb. 24, 2015, the disclosure of which is incorporated herein by reference in its entirety.

TECHNICAL FIELD

Example embodiments presented herein are directed towards a wireless device and a Policy Control and Charging (PCC) based node, as well as corresponding methods therein, for managing an operating system and/or application behavior of a wireless device based on an indication of a network initiated policy and/or charge change.

BACKGROUND

In a typical cellular system, also referred to as a wireless communications network, wireless terminals, also known as wireless devices, mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

It should be appreciated that different events may occur which causes changes in the network while a wireless device is still connected to the network. For example, sponsored services are beginning to take off. Such services may affect to charging of communications between the network and various devices. Furthermore, QoS might also change for instance during day depending on an expected or unexpected usage of the network. Also small cells makes it possible to increase QoS within a specific area, such as within an enterprise building. These changes effect quality and/or charging policies in the network

SUMMARY

The problem is that the user is not always aware of the network actions taking place. Today the wireless device (e.g., user) is not being explicitly notified of changes to the network dealing with quality and/or changing. An example of such a change is an instance of zero charged 3GPP access or changed QoS requirement. No automatic actions are taken today in the wireless device based on the QoS or sponsored connectivity status. On the other hand many wireless device OS' today has a setting to prohibit background downloading of files until non metered access, such as free Wifi is reached.

Thus, at least one object of the example embodiments presented herein is to provide a means of making the wireless device aware of network conditions and policy decisions. An example advantage of the example embodiments presented herein is that the wireless device may become aware of current network conditions and policy decisions and therefore act appropriately on an operating system and/or application level. Specifically, applications in the wireless device may take actions based on knowledge of a changed status in the network. Thus, the example embodiments presented herein provide a better end-user experience.

Accordingly, some of the example embodiments are directed towards a method, in a wireless device, for managing an operating system and/or application behavior based on an indication of a network initiated policy and/or charge change. The wireless device is configured for use in a wireless communications network. The method comprises receiving, in a mobile terminating connectivity layer, a message originated from a Policy Control and Charging (PCC) based node. The method further comprises determining the message comprises the indication of the network initiated policy and/or charge change. The method also comprises forwarding the message to an operating system and/or application layer. The method also comprises modifying the behavior of an application in the operating system and/or application layer based on the indication.

Some of the example embodiments are directed towards a wireless device for managing an operating system and/or application behavior based on an indication of a network initiated policy and/or charge change. The wireless device is configured for use in a wireless communications network. The wireless device comprises a receiving unit configured to receive, in a mobile terminating connectivity layer, a message originated from a Policy Control and Charging (PCC) based node. The wireless device further comprises a processing unit configured to determine the message comprises the indication of the network initiated policy and/or charge change. The wireless device also comprises a transmitting unit configured to forward the message to an operating system and/or application layer. The processing unit is further configured to modify an application behavior in the operating system and/or application layer based on the indication.

Some of the example embodiments are directed towards a method, in a PCC based node, for managing an operating system and/or application behavior in a wireless device based on an indication of a network initiated policy and/or charge change. The PCC based node is configured for use in a wireless communications network. The method comprises identifying a triggering event resulting in the network initiated policy and/or charge change. The method also comprises sending, to an operating system and/or application layer of a wireless device, the indication of the network initiated policy and/or charge change.

Some of the example embodiments are directed towards a PCC based node for managing an operating system and/or application behavior in a wireless device based on an indication of a network initiated policy and/or charge change. The PCC based node is configured for use in a wireless communications network. The PCC based node comprises a processing unit configured to identify a triggering event resulting in the network initiated policy and/or charge change. The PCC based node also comprises a transmitting unit configured to send, to an operating system and/or application layer of a wireless device, the indication of the network initiated policy and/or charge change.

DEFINITIONS

3GPP Third Generation Partnership Project
BSC Base Station Controller
E-UTRAN Evolved Universal Terrestrial Radio Access Network
eNodeB Evolved NodeB
EPC Evolved Packet Core
GERAN GSM/EDGE Radio Access Network
GPRS General Packet Radio Service
GSM Global System for Mobile Communications
HSS Home Subscriber Server
IMSI International Mobile Subscriber Identity
LTE Long Term Evolution
MME Mobility Management Entity
MNO Mobile Network Operators
OS Operating System
OSC Online Charging System
PCEF Policy and Charging Enforcement Function
PCRF Policy Control and Charging Rules Function
PCC Policy Control and Charging
PDN Packet Data Network
PGW PDN Gateway
QoS Quality of Service
RAN Radio Access Network
RBS Radio Base Station
RNC Radio Network Controller
SDF Service Data Flow
SGSN Serving GPRS Support Node
SGW Serving Gateway
SMS Short Message Service
UE User Equipment
UMTS Universal Mobile Telecommunications System
UTRAN UMTS Terrestrial Radio Access Network
WCDMA Wideband Code Division Multiple Access
WiFi Wireless Fidelity

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that the term UE and wireless device may be used interchangeably. It should be appreciated that all of the example embodiments presented herein may be applicable to a GERAN, UTRAN, E-UTRAN, Wi-Fi based system.

General Overview

Figure 1:
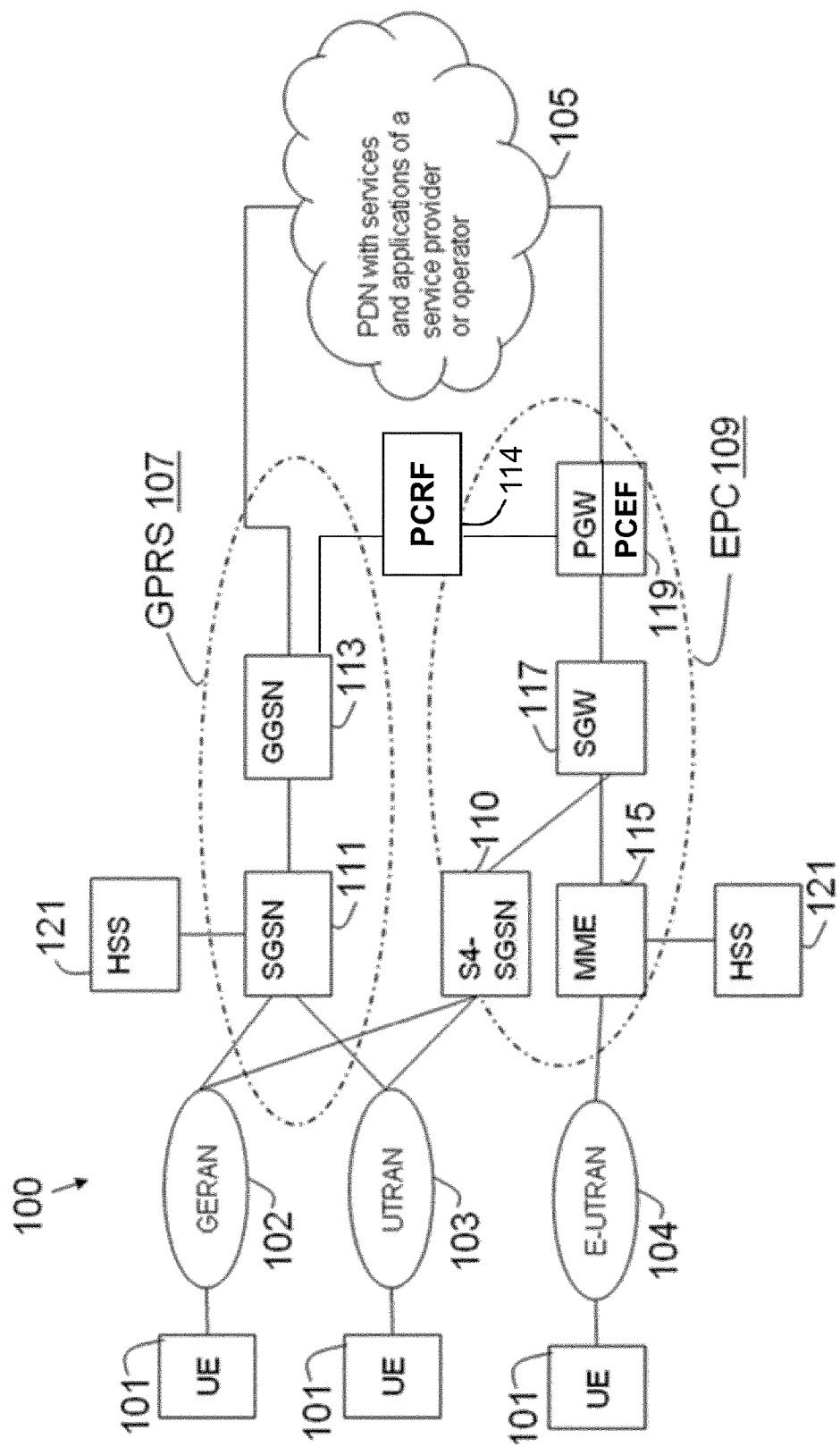
FIG. 1 is an illustrative example of a wireless network.

Example embodiments presented herein are directed towards managing an operating system and/or application behaviour, in a wireless device, based on an indication of a network initiated policy and/or charge change. In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

The network of FIG. 1 may also comprise a Policy Control and Charging (PCC) system. One node in such a system is a Policy Control and Charging Rules Function (PCRF). The PCRF encompasses policy control decision and flow-based charging control functionalities. A function in the PCC system is a Policy and Charging Enforcement Function (PCEF). The PCEF is typically situated in the PGW. The PCEF is used for Service Data Flow (SDF) detection, policy enforcement and flow-based charging functionalities. Yet another node in the PCC system is an Online Charging System (OCS). The OCS provides credit management and grants credit to the PCEF based on time, traffic volume or chargeable events.

Overview of the Example Embodiments

It should be appreciated that different events may occur which causes changes in the network while a wireless device is still connected to the network. For example, sponsored services are beginning to take off. Such services may affect to charging of communications between the network and various devices. Furthermore, QoS might also change for instance during day depending on an expected or unexpected usage of the network. Also small cells makes it possible to increase QoS and/or free rate traffic within a specific area, such as within an enterprise building. These changes effect quality and/or charging policies in the network The problem is that the user is not always aware of the network actions taking place. Today the wireless device (e.g., user) is not being notified of changes to the network dealing with quality and/or changing. An example of such a change is an instance of zero charged 3GPP access or changed QoS requirement. No automatic actions are taken today in the wireless device based on the QoS or sponsored connectivity status. On the other hand many wireless device OS' today has a setting to prohibit background downloading of files until non metered access, such as free Wifi is reached. Furthermore, Wifi hotspots owned by MNOs may be free for some users but not for others, indicating this to the OS may be beneficial.

Thus, at least one object of the example embodiments presented herein is to provide a means of making the wireless device aware of network conditions. An example advantage of the example embodiments presented herein is that the wireless device may become aware of current network conditions and therefore act appropriately on an operating system and/or application level. Specifically, applications in the wireless device may take actions based on knowledge of a changed status in the network. Thus, the example embodiments presented herein provide a better end-user experience.

Figure 2:
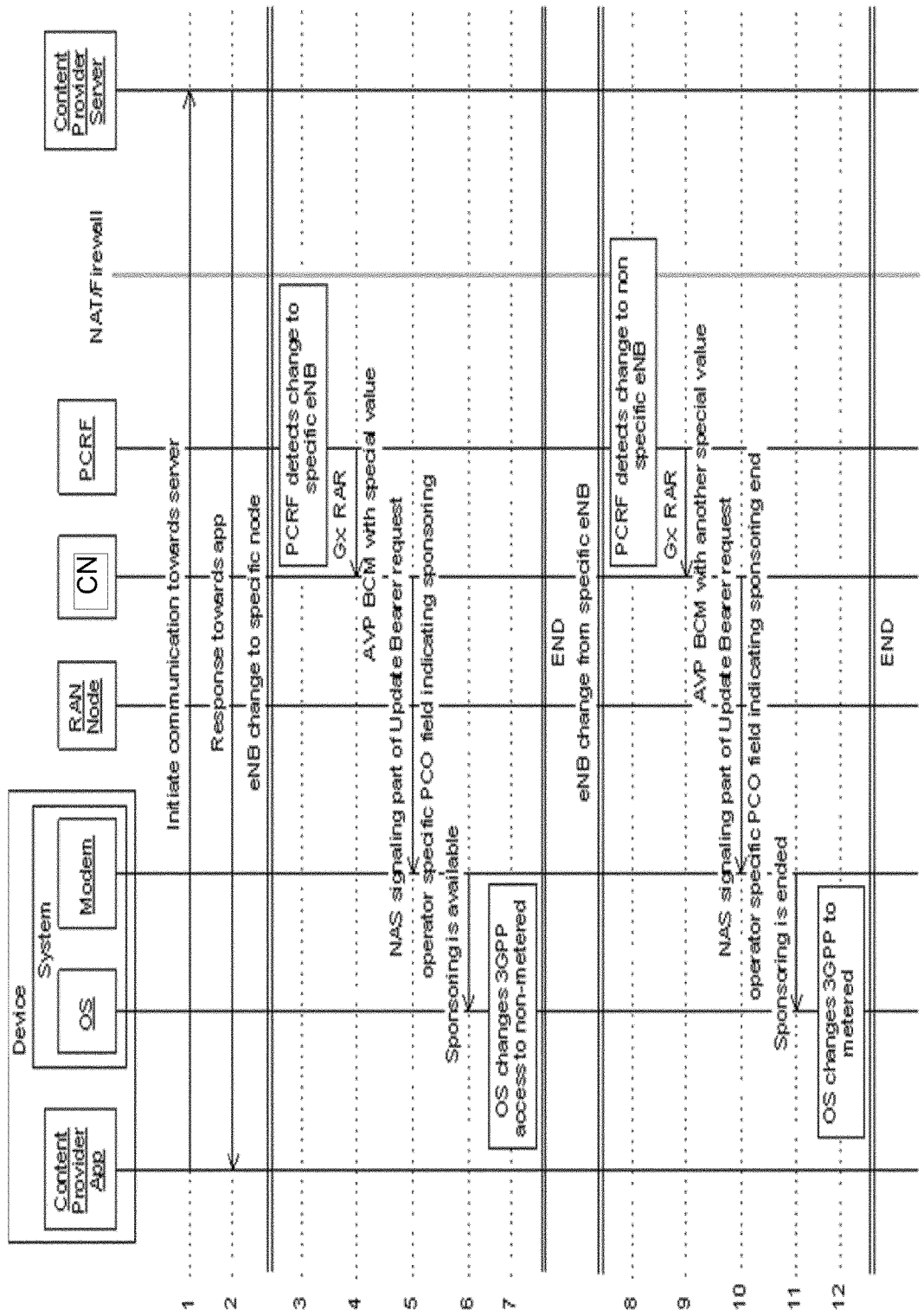
FIGS. 2 and 3 are message passing diagrams illustrating the notification of a network initiated policy and/or charge change, according to some of the example embodiments presented herein.

FIG. 2 illustrates a messaging diagram for providing an indication of a network initiated policy and/or charge change, according to some of the example embodiments presented herein. It should be appreciated the messages and actions will be described according to the corresponding line number in which the message or action is situated.

First, an application running in a wireless device may initiate a communication with an application or content provider sever (message 1). The server may in return respond to the application initiating the communication (message 2). Thereafter, an event may occur in the network where the eNB may make a charge and/or policy related change for a specific wireless device (action 2.5).

According to some of the example embodiments, the charge and/or policy change may be entering a non-metered coverage area and/or a change in a required QoS. According to some of the example embodiments, events that trigger such a change may be a current time and/or location of the wireless device, a current congestion level experienced by the wireless device, and/or a subscription policy associated with the wireless device.

Upon the network initiated change, the PCRF may detect the change (action 3). Thereafter, the PCRF may send, to a core network node, a message comprising an indication of the network initiated change (message 4).

According to some of the example embodiments, the core network node may be the PCEF, via the PGW. Thereafter, the message is forwarded to the SGW, MME, eNB and finally to the wireless device.

According to some of the example embodiments, the core network node may be a MME. Thereafter, the message is forwarded to the eNB and finally to the wireless device.

According to the example embodiments where the message is sent to a core network node, the indication may be an information element in the form of a PCO or a network name information element. It should be appreciated that rather than a core network node, the PCRF may send message 4 directly to the wireless device via a SMS or as data traffic over the user plane.

In the example embodiment illustrated by FIG. 2, the core network node forwards the message to the wireless device via a eNB, as described above (message 5). The message is received in a mobile terminating connectivity layer (labeled as modem in FIG. 2). Thereafter, the wireless device forwards the indication of the network initiated change to an operating system and/or application layer within the wireless device (message 6).

Upon the sending of message 6, the operating system and/or application layer of the wireless device is made aware of the network initiated change identified in the indication.

Thus, in contrast to prior systems, the operating system and/or application layer does not obtain knowledge of such a change.

As a result of message 6, an application in the operating system and/or application layer may be modified based on the initiated network change (action 7). According to some of the example embodiments, the modification may comprise initiating a communication with the network. For example, if the application is now aware that the wireless device is in a non-metered area (as illustrated in FIG. 2), the application may start downloading data from the network. According to some of the example embodiments, the modification of the application may comprise restricting a communication within the network. For example, if a QoS requirement has increased, the application may be restricted from communications with the network.

Thereafter, the PCRF may detect that the change initiated by the network is now finished (action 8). Thereafter, the PCRF may send another message to the core network node with an indication that the network initiated change has ended (message 9). It should be appreciated that messages 9-11 mirror messages 4-6 described above with the difference being what is indicated. In messages 4-6 an indication that a network initiated change has been made is provided. In messages 9-11 an indication that the network initiated change is finished is provided. Upon notification of the end of the network initiated change, the operating system and/or application layer may make any necessary modifications to the application. It should be appreciated that the indications discussed in relation to the example embodiments may be applications specific. Thus, the modifications made may be specific to certain applications that may be identified in the indication or the wireless device may know if which applications modifications may be necessary based on any predefined rules within the wireless device.

Figure 3:
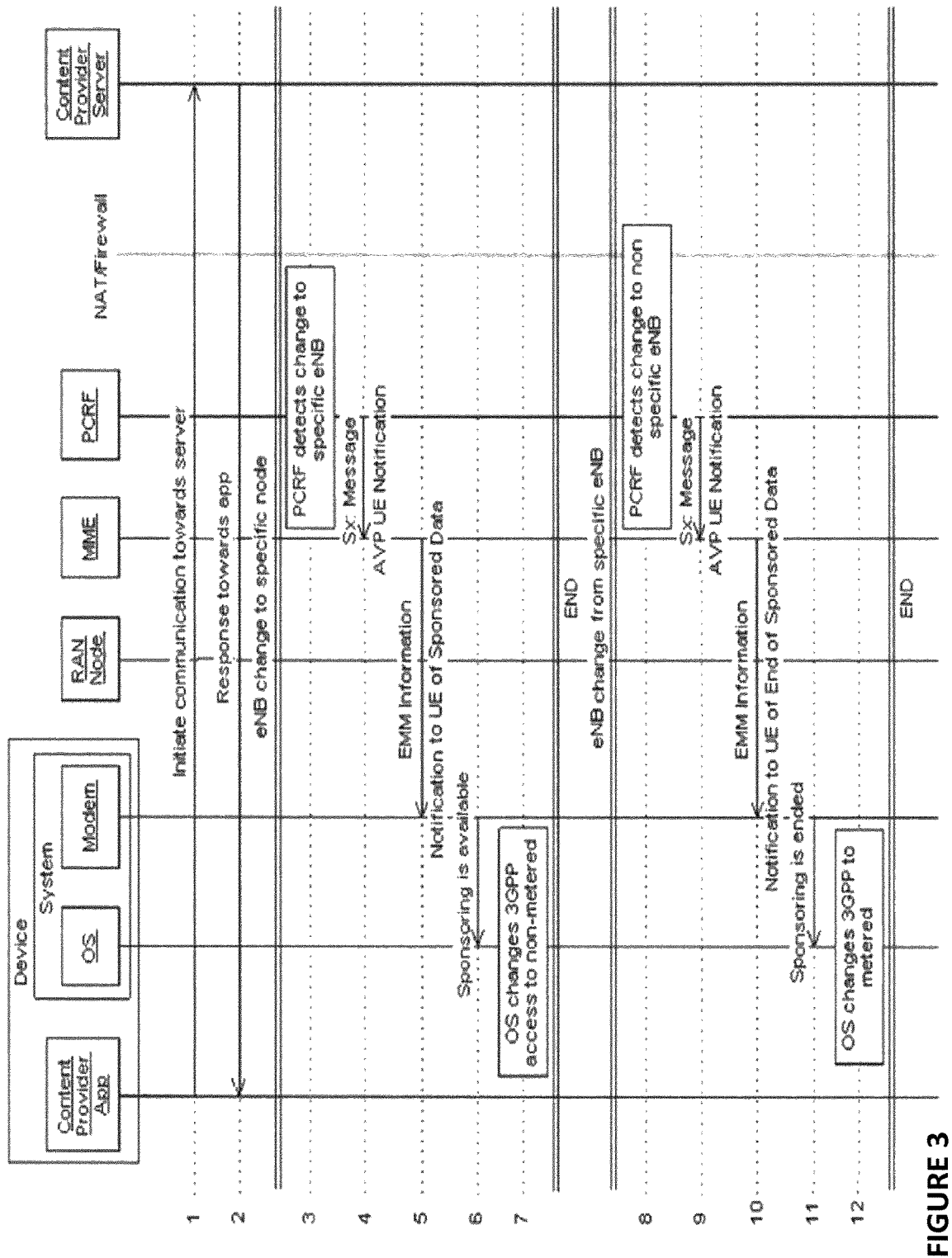

FIG. 3 also illustrates a messaging diagram for providing an indication of a network initiated policy and/or charge change, according to some of the example embodiments presented herein. The messages and actions of FIG. 3 are largely similar to that of FIG. 2. FIG. 3 illustrates one of the example embodiments mentioned in the description of FIG. 2. Specifically, FIG. 3 illustrates the embodiment where the PCRF sends the message comprising the indication of the network initiated change to the MME (message 4). The MME in turn forwards the indication to the wireless device via the eNB in an EMM message (message 5).

Similarly as described in relation to FIG. 2, once the operating system and/or application layer is made aware of the network initiated policy and/or charge change, an application may be modified accordingly. Messages 9-11 are similar to that of messages 4-6. In messages 4-6, an indication is provided that a network initiated policy and/or charge change has occurred. In messages 9-11, an indication is provided that the network initiated policy and/or charge has ended.

Example Node Configurations

Figure 4:
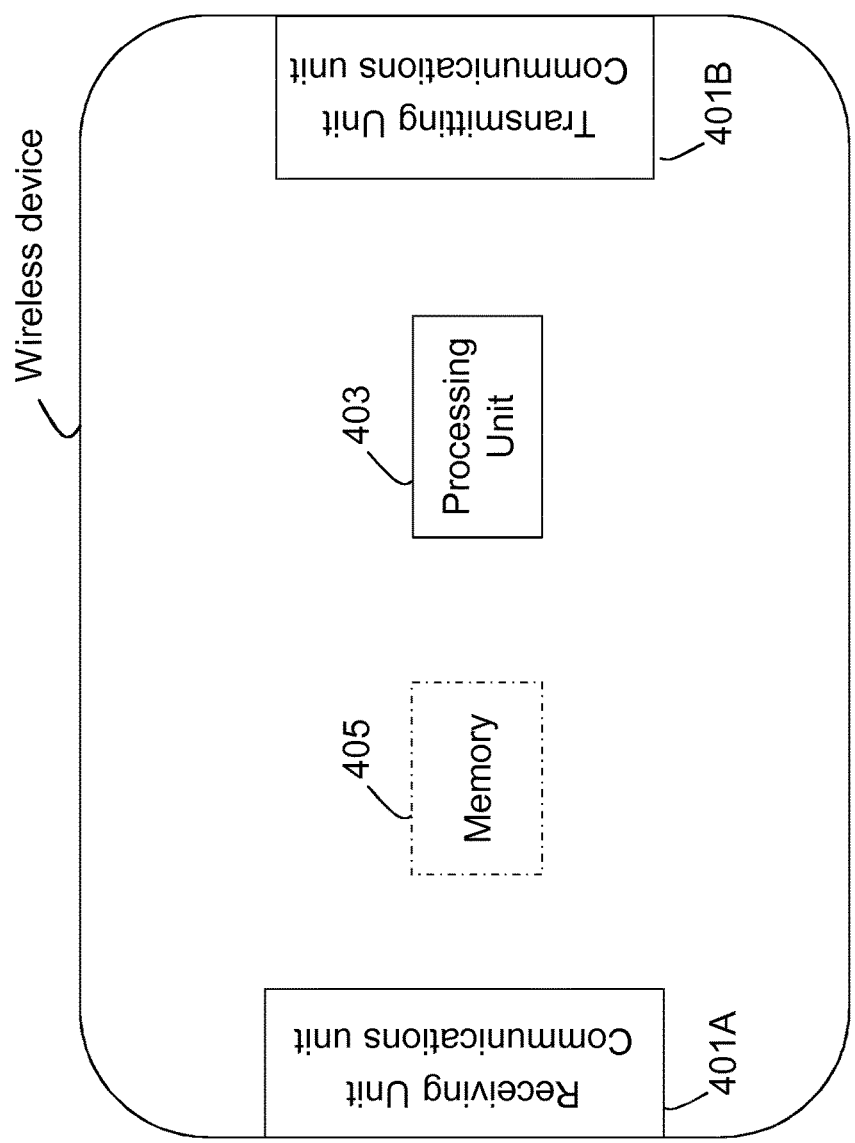
FIG. 4 is an illustration of an example node configuration of a wireless device, according to some of the example embodiments presented herein.

FIG. 4 illustrates an example node configuration of a wireless device. The wireless device may perform some of the example embodiments described herein. The wireless device may comprise radio circuitry, a communications unit or a receiving unit 401A and transmitting unit 401B that may be configured to receive and/or transmit communication data, instructions, messages and/or any information related to indicating a network initiated policy and/or charge change. It should be appreciated that the radio circuitry, a communication port or a receiving 401A and transmitting 401B units may be comprised as any number of transceiving, receiving, and/or transmitting units, modules or circuitry.

The wireless device may also comprise a processing module, unit or circuitry 403 which may be configured to determine an indication of a network initiated policy and/or charge change, or modify an application accordingly, described herein. The processing circuitry 403 may be any suitable type of computation unit, for example, a microprocessor, digital signal processor (DSP), field programmable gate array (FPGA), or application specific integrated circuit (ASIC), or any other form of circuitry. The wireless device may further comprise a memory unit or circuitry 405 which may be any suitable type of computer readable memory and may be of volatile and/or non-volatile type. The memory 405 may be configured to store received, and/or transmitted, or any form of information related to the indication of a network initiated policy and/or charge change as described herein, and/or executable program instructions.

Figure 5:
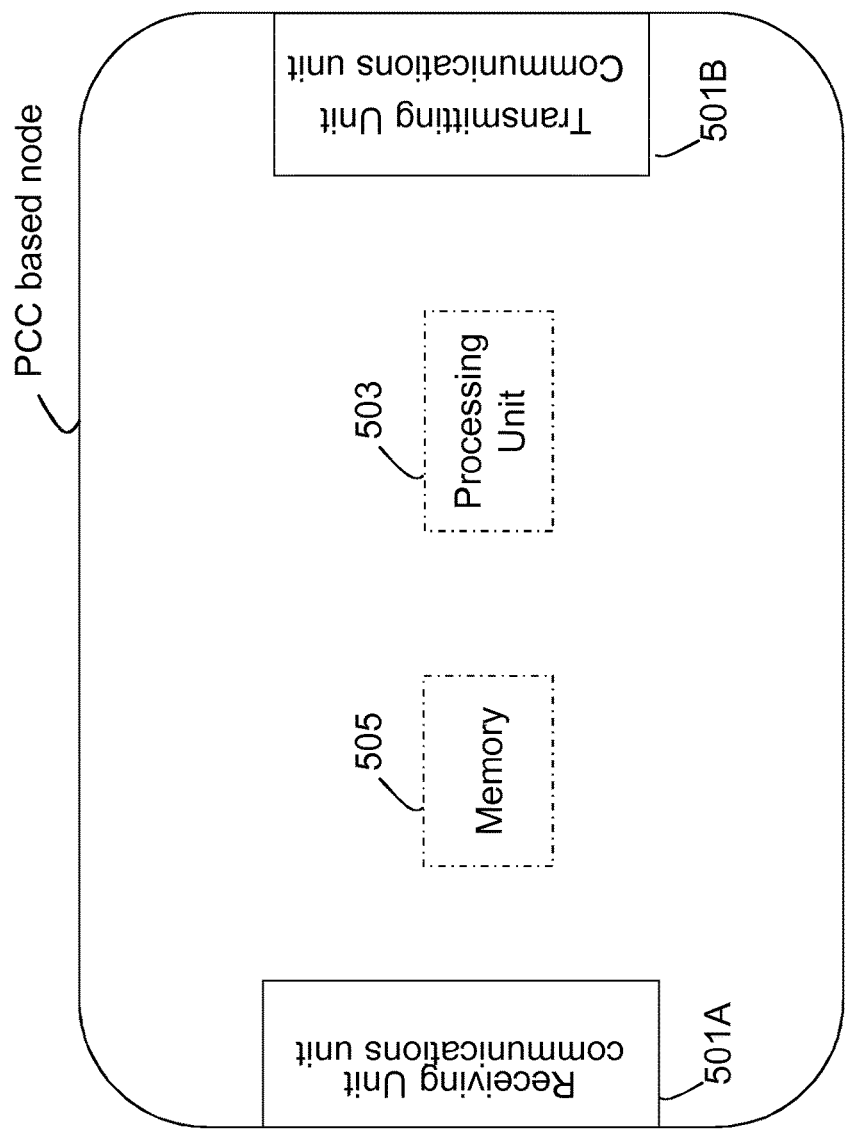
FIG. 5 is an illustration of an example node configuration of a PCC based node, according to some of the example embodiments presented herein.

FIG. 5 illustrates an example node configuration of a PCC based node. It should be appreciated that the PCC based node may be a PCRF or an OCS. The PCC based node may perform some of the example embodiments described herein. The PCC based node may comprise radio circuitry, a communication port or a receiving unit 501A and transmitting unit 501B that may be configured to receive and/or transmit communication data, instructions, messages and/or any information related to the indication of a network initiated policy and/or charge change. It should be appreciated that the radio circuitry, a communication port or a receiving 501A and transmitting 501B units may be comprised as any number of transceiving, receiving, and/or transmitting units, modules or circuitry.

The PCC based node may also comprise a processing module, unit or circuitry 503 which may be configured to determine the indication of a network initiated policy and/or charge change as described herein. The processing circuitry 503 may be any suitable type of computation unit, for example, a microprocessor, digital signal processor (DSP), field programmable gate array (FPGA), or application specific integrated circuit (ASIC), or any other form of circuitry. The PCC based node may further comprise a memory unit or circuitry 505 which may be any suitable type of computer readable memory and may be of volatile and/or non-volatile type. The memory 505 may be configured to store received, and/or transmitted, or any form of information related to the indication of the network initiated policy and/or charge change as described herein, and/or executable program instructions.

Example Node Operations

Figure 6A:
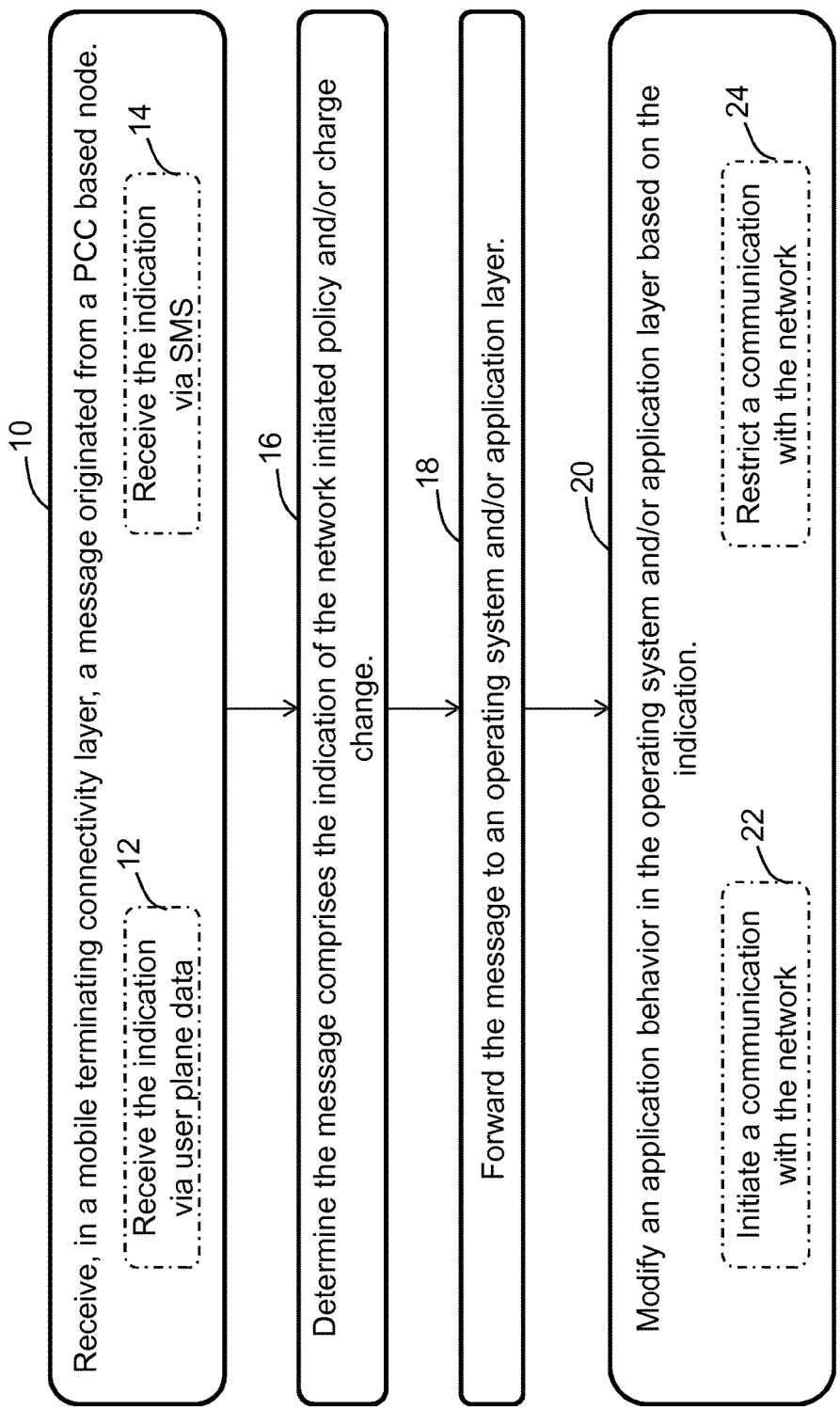
FIG. 6A is a flow diagram of example operations which may be taken by the wireless device of FIG. 4, according to some of the example embodiments.

FIG. 6A is a flow diagram depicting example operations that may be taken by the wireless device as described herein for managing an operating system and/or application behaviour based on an indication of the network initiated policy and/or charge change.

It should also be appreciated that FIG. 6A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 6B:
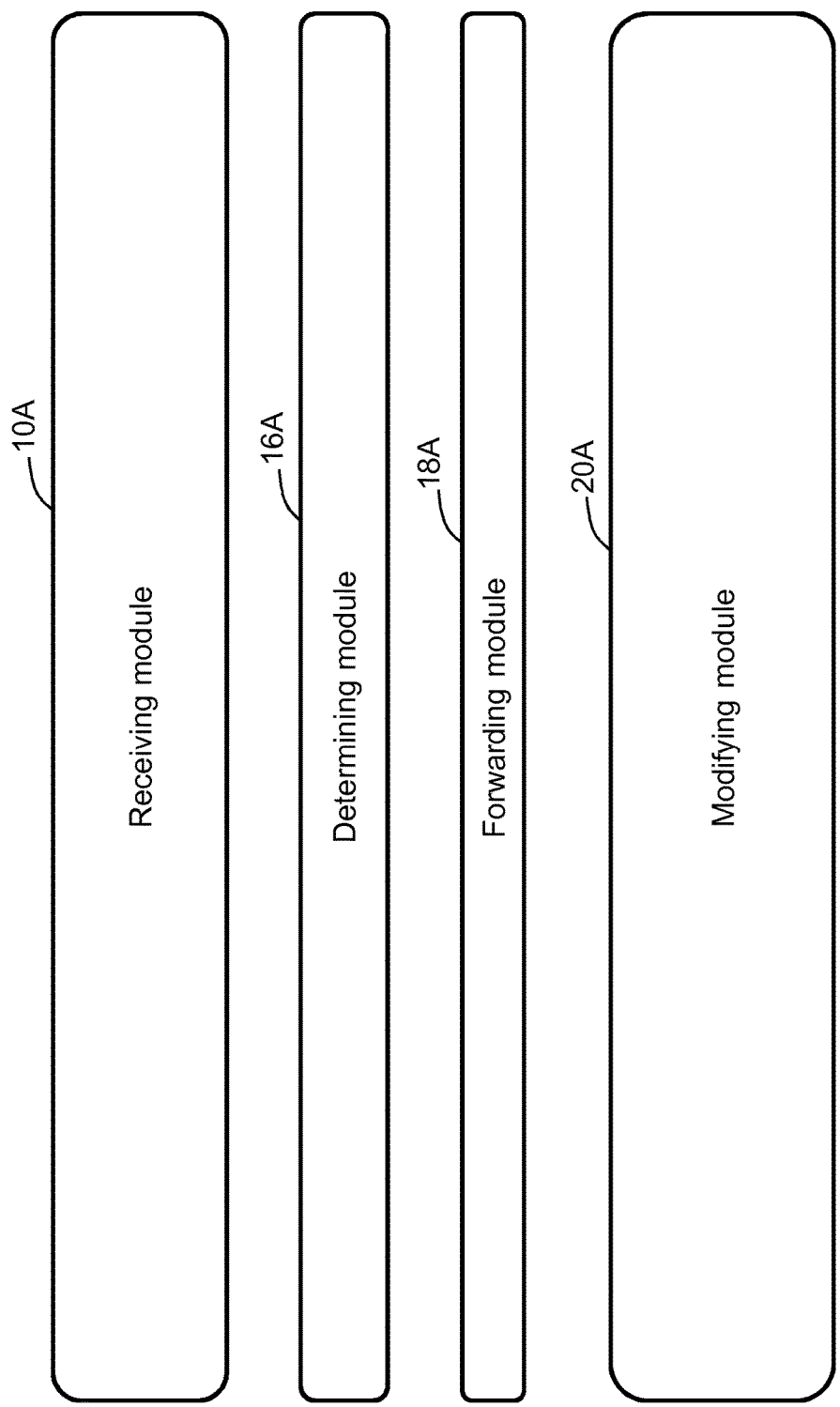
FIG. 6B is an illustration of modules which may perform at least some of the operations of FIG. 6A, according to some of the example embodiments.

FIG. 6B illustrates a module diagram illustrating various modules which may be used in the implementation of the broadest embodiment of FIG. 6A.

Operation 10

The wireless device is configured to receive 10, in a mobile terminating connectively layer, a message originated from a PCC based node. The receiving unit is configured to receive, in the mobile terminating connectivity layer, the message originated from the PCC based node. The receiving module 10A is configured to perform operation 10.

Examples of operation 10 are illustrated in FIGS. 2 and 3 as message 5. While the messages of FIGS. 2 and 3 may not be sent directly from the PCC based node, the message originates from the PCC based node.

Example Operation 12

According to some of the example embodiments, the receiving 10 may further comprise receiving 12 the message via user plane data. The receiving unit 401A is configured to receive the message via user plan data.

It should be appreciated that under such example embodiments, the PCC based node may be able to send the message to the wireless device via the core network nodes (messages 4-6 in FIGS. 2-3).

Example Operation 14

According to some of the example embodiments, the receiving may further comprise receiving 14 the message via a SMS. The receiving unit 401A is configured to receive the message via a SMS.

It should be appreciated that under such example embodiments, the PCC based node may send the message directly to the wireless device.

Operation 16

The wireless device is further configured to determine 16 the message comprises the indication of the network initiated policy and/or charge change. The processing unit 403 is configured to determine the message comprises the indication of the network initiated policy and/or charge change. The determining module 16A is configured to perform operation 16.

The network initiated policy and/or charge change is a start or stop of a non-metered connection and/or a change in a QoS, as discussed in FIGS. 2 and 3. According to come of the example embodiments, the indication is an information element in the form of a QoS information element, a Network Name information element or a PCO.

Operation 18

The wireless device is also configured to forward 18 the message to an operating system and/or application layer of the wireless device. The processing unit 403 is configured to forward the message to the operating system and/or application layer of the wireless device. The forwarding module 18A is configured to perform operation 18.

Thus, in contrast to present system, according to the example embodiments, the operating system and/or application layer is made aware of the network initiated policy and/or charge change.

Operation 20

Thereafter, the wireless device is configured to modify 20 an application in the operating system and/or application layer based on the indication. The processing unit 403 is configured to modify the application in the operating system and/or application layer based on the indication. The modifying module 20A is configured to perform operation 20.

It should be appreciated that according to some of the example embodiments, the indication may be application specific. Therefore, the modification need not be applied to all applications associated with the wireless device. According to some of the example embodiments, the modifications may be applied to applications identified in the indication and/or based on predefined rules within the wireless device.

Example Operation 22

According to some of the example embodiments, the modifying 20 may further comprise initiating 22 a communication with the network. The processing unit 403 may be configured to initiate the communication with the network.

For example, if the application is now aware that the wireless device is in a non-metered area (as illustrated in FIG. 2), the application may start downloading data from the network.

Example Operation 24

According to some of the example embodiments, the modifying may further comprise restricting a communication with the network. The processing unit 403 is configured to restrict the communication with the network.

For example, if a QoS requirement has increased, the application may be restricted from communications with the network.

Figure 7A:
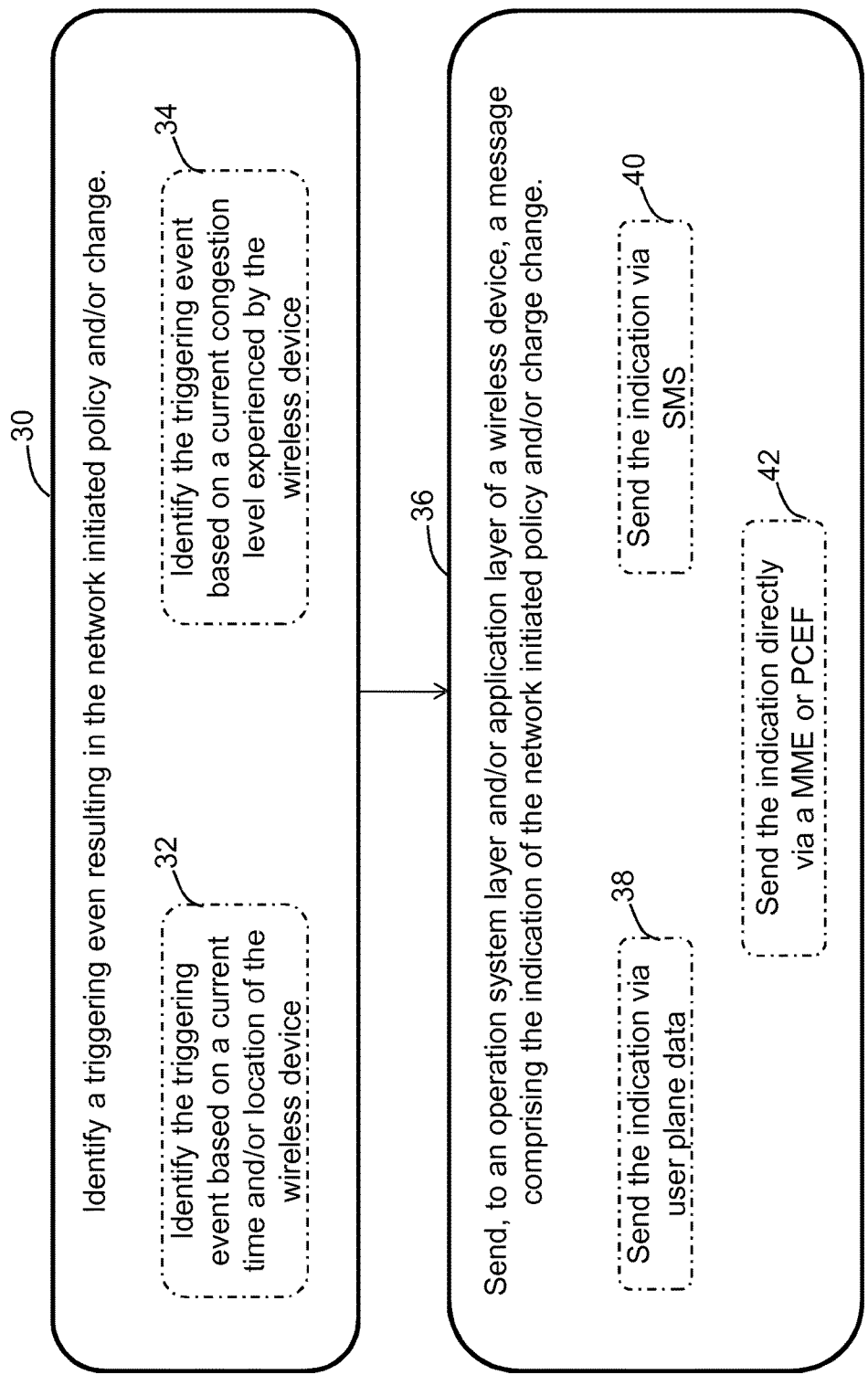
FIG. 7A is a flow diagram of example operations which may be taken by the PCC based node of FIG. 5, according to some of the example embodiments.

FIG. 7A is a flow diagram depicting example operations that may be taken by the PCC based node as described herein for managing an operating system and/or application behaviour based on an indication of the network initiated policy and/or charge change. The PCC based node is a PCRF or an OCS.

It should also be appreciated that FIG. 7A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 7B:
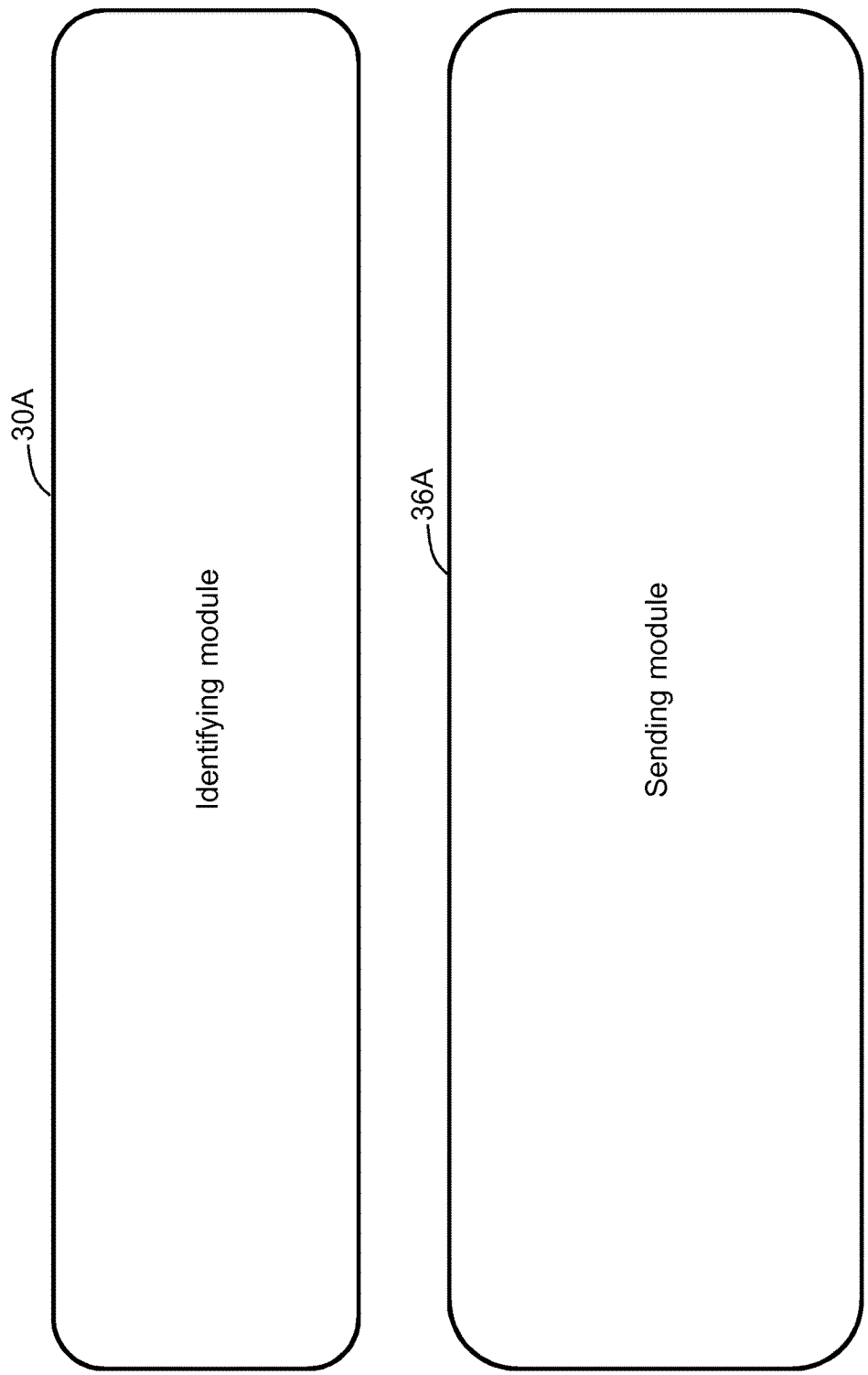
FIG. 7B is an illustration of modules which may perform at least some of the operations of FIG. 7A, according to some of the example embodiments.

FIG. 7B illustrates a module diagram illustrating various modules which may be used in the implementation of the broadest embodiment of FIG. 7A.

Operation 30

The PCC based node is configured to identify a triggering event resulting in the network initiated policy and/or charge change. The processing unit 503 is configured to identify the triggering event resulting in the network initiated policy and/or charge change. The identifying module 30A is configured to perform operation 30.

The network initiated policy and/or charge change is a start or stop of a non-metered connection and/or a change in a QoS, as discussed in FIGS. 2 and 3.

Example Operation 32

According to some of the example embodiments, the identifying 30 further comprises identifying 32 the triggering event based on a current time and/or location of the wireless device. The processing unit 503 is configured to identify the triggering event based on the current time and/or location of the wireless device.

For example, a policy and/or charge change may be initiated based on a subscription which provides for such a change based on the current time and/or location of the wireless device. As another example, depending on a current location or time, a higher level of congestion may be expected, which may also result in the network initiated policy and/or charge change.

Example Operation 34

According to some of the example embodiments, the identifying 30 further comprises identifying 34 the triggering event based on a current congestion level experienced by the wireless device. The processing unit 503 is configured to identify the triggering event based on the current congestion level experienced by the wireless device.

For example, if a higher level of congestion is experienced, the network may initiate a change featuring a lower level of QoS to be required by the wireless device.

Operation 36

The PCC based node is further configured to send 36, to an operating system and/or application layer of a wireless device, a message comprising the indication of the network initiated policy and/or charge change. The transmitting unit 501B is configured to send, to the operating system and/or application layer of the wireless device, the message comprising indication of the network initiated policy and/or charge change. The sending module 36A is configured to perform operation 36.

According to some of the example embodiments, the indication is an information element in the form of a QoS information element, a Network Name information element or a PCO. According to some of the example embodiments, the indication is application specific.

Example Operation 38

According to some of the example embodiments, the sending 36 may further comprise sending 38 the message via user plane data. The transmitting unit 501B is configured to send the message via user plane data.

It should be appreciated that under such example embodiments, the PCC based node may be able to send the message to the wireless device via the core network nodes (messages 4-6 in FIGS. 2-3).

Example Operation 40

According to some of the example embodiments, the sending 36 may further comprise sending 40 the message via a SMS. The transmitting unit 501B is configured to send the message via a SMS.

It should be appreciated that under such example embodiments, the PCC based node may send the message directly to the wireless device.

Example Operation 42

According to some of the example embodiments, the sending 36 may further comprise sending 42 the message directly via a MME or a PCEF, via the PGW. The transmitting unit 501B is configured to send the message directly via a MME or a PCEF, via the PGW.

As shown in FIG. 2, the PCC based node sends the message directly to the PGW (in which the PCEF is comprised). Thereafter the PGW forwards the message to the SGW and the SGW in turn forwards the message to the eNB which sends the message to the wireless device (FIG. 2, messages 4-6).

As shown in FIG. 3, the PCC based node sends the message directly to the MME. Thereafter the MME forwards the message to the eNB which sends the message to the wireless device (FIG. 3, messages 9-11).

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following non-limiting summary of example embodiments.

The invention claimed is:

1. A method, in a wireless device, for managing an operating system and/or application behavior based on an indication of a network initiated policy and/or charge change, the wireless device being configured for use in a wireless communications network, the method comprising:
   receiving, in a mobile terminating connectivity layer, a message originated from a Policy Control and Charging, PCC, based node;
   determining the message comprises the indication of the network initiated policy and/or charge change;
   forwarding the message to an operating system and/or application layer; and
   modifying an application behavior in the operating system and/or application layer based on the indication,
   wherein the network initiated policy and/or charge change comprises a start or stop of a non-metered connection.

2. The method of claim 1, wherein the network initiated policy and/or charge change further comprises a change in a Quality of Service.

3. The method of claim 1, wherein the receiving further comprises receiving the message via user plane data.

4. The method of claim 1 wherein the receiving further comprises receiving the message via a short message service.

5. The method of claim 1, wherein the indication is an information element in the form of a Quality of Service information element, a Network Name information element, or a Protocol Configuration Option, PCO.

6. The method of claim 1, wherein the modifying further comprises initiating a communication with the network.

7. The method of claim 1, wherein the modifying further comprises, restricting a communication with the network.

8. The method of claim 1, wherein the indication of the network initiated policy and/or charge change is application specific.

9. A wireless device for managing an operating system and/or application behavior based on an indication of a network initiated policy and/or charge change, the wireless device being configured for use in a wireless communications network, the wireless device comprising:
   a receiving unit configured to receive, in a mobile terminating connectivity layer, a message originated from a Policy Control and Charging, PCC, based node;
   a processing unit configured to determine the message comprises the indication of the network initiated policy and/or charge change;
   the processing unit further configured to forward the message to an operating system and/or application layer; and
   the processing unit configured to modify an application behavior in the operating system and/or application layer based on the indication,
   wherein the network initiated policy and/or charge change comprises a start or stop of a non-metered connection.

10. The wireless device of claim 9, wherein the network initiated policy and/or charge change further comprises a change in a Quality of Service.

11. The wireless device of claim 9, wherein the receiving unit is further to receive the message via user plane data.

12. The wireless device of claim 9 wherein the receiving unit is further configured to receive the message via a short message service.

13. The wireless device of claim 9, wherein the indication is an information element in the form of a Quality of Service information element, a Network Name information element, or a Protocol Configuration Option, PCO.

14. The wireless device of claim 9, wherein the processing unit is further configured to modify the application via having the application initiate a communication with the network.

15. The wireless device of claim 9, wherein the process unit is further configured to modify the application via having the application restrict a communication with the network.

16. The wireless device of claim 9, wherein the indication of the network initiated policy and/or charge change is application specific.

* * * * *